United States Patent [19]

Batten

[11] Patent Number: 4,737,059
[45] Date of Patent: Apr. 12, 1988

[54] EASILY RELEASEABLE FASTENER

[76] Inventor: Ronald W. Batten, 5618 White Ct., Torrance, Calif. 90503

[21] Appl. No.: 802,425

[22] Filed: Nov. 27, 1985

[51] Int. Cl.$^4$ .............................................. F16B 37/10
[52] U.S. Cl. .................................... 411/437; 411/433; 411/434
[58] Field of Search ............... 411/432, 433, 437, 427, 411/39, 49, 324, 278, 280, 281

[56] References Cited

U.S. PATENT DOCUMENTS

| | | | |
|---|---|---|---|
| 2,828,662 | 4/1958 | Antal | 411/437 |
| 3,170,363 | 2/1965 | Dickie | 411/434 |
| 3,334,536 | 8/1967 | Armstrong | 411/434 |
| 3,813,984 | 6/1974 | Selinder | 411/434 |
| 3,952,626 | 4/1976 | Townsend | 411/433 |
| 4,082,468 | 4/1978 | Von Base | 411/432 |

FOREIGN PATENT DOCUMENTS 2316404  10/1974  Fed. Rep. of Germany .

*Primary Examiner*—William F. Pate, III
*Assistant Examiner*—Creighton Smith
*Attorney, Agent, or Firm*—Plante, Strauss & Vanderburgh

[57] ABSTRACT

There is disclosed an easily releaseable, internally threaded fastener having at least one axial slot which extends substantially through the wall of the fastener. The external wall of the fastener is non-cylindrical, e.g. hexagonal, or three-lobed, to permit the application of a fastening torque to the fastener. The fastener is surrounded by a retainer sleeve having a mating, internal wall portion which provides hoop strength to the fastener. The retainer also has an annular recess in its internal wall whereby the retainer can be slid axially, or rotated, to release the fastener. The fastener assembly includes a metal spacer seated in each axial slot of the fastener to permit the even transmission of the fastener application torque. In preferred embodiments, the fastener is formed by cutting several axial slots through the body of the fastener, but terminating short of severing the threads, thereby providing a fastener which, when released by the retainer, will yieldingly fail, thus avoiding the mechanical shock of release which is experienced upon the release of separate fastener segments.

19 Claims, 3 Drawing Sheets

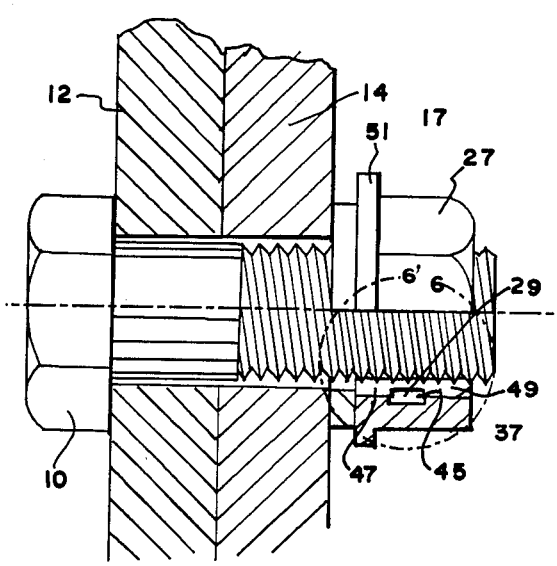
FIG. 4
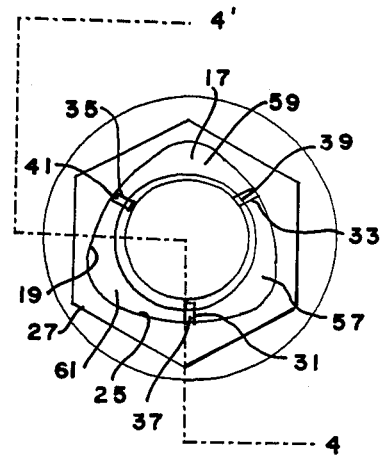
FIG. 5
FIG. 6
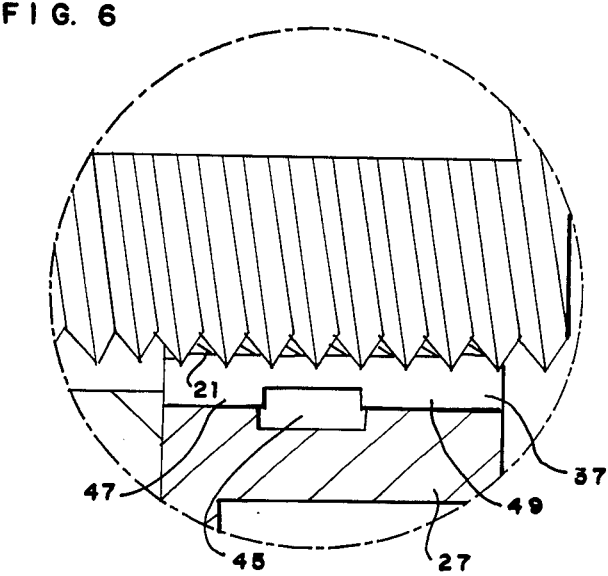

EASILY RELEASEABLE FASTENER

BACKGROUND OF THE INVENTION

1. Field Of The Invention

This invention relates to a releaseable fastener, and in particular to a slotted fastener having a displaceable retainer sleeve to release the fastener.

2. Brief Statement Of The Prior Art

Releaseable fasteners, typcally separation nuts, have been used in various aerospace applications, often with explosive squibs or with fluid pressure, for remote release. These devices have universally used an axially displaceable retainer which surrounds an assembly of a segmented nut fastener. Many complex designs have been developed with annular cavities in the retainer ring, such as in U.S. Pat. No. 3,334,536 and cams or levers have been provided to impart a positive separation force to the segments as the retainer sleeve is displaced, e.g., see U.S. Pat. No. 3,120,149. The latter patent also discloses a hexagonal interface between the segmented nut and the retainer sleeve to transmit torque. This patent, however, uses two nut segments which precisely mate, without any axial separation slot. The nut segments of this patent would be quite costly to manufacture, as each nut segment must be separately machined.

U.S. Pat. No. 3,813,984 discloses that a practical and cost effective method of manufacturing a segmented nut fastener is by axially slitting a preformed nut fastener. This, however, creates axial separation slots between the segments. In U.S. Pat. No. 3,170,363 the axial slots are filled with plastic fins which provide thread locks. Plastic fins, however, cannot transmit any significant torque, and axial keys are provided between each of the nut segments and the retainer sleeve to transmit the fastening torque. Thus, the most economical method of manufacture of slitting nuts, has heretofore precluded a simple design for transmission of fastening torque, and most designs have used complex keys and mating keyways between the nut segments and the outer, retainer sleeve.

Another undesirable feature of the separation fasteners which have previously been used is the separation shock generated upon the release of the retainer sleeve, which is particularly severe with the explosive-squib-actuated fasteners. Again, complex designs such as disclosed in U.S. Pat. No. 3,813,984 have been developed for minimizing or balancing the mechanical shock of release, but not attempt has been made to change the fundemental nature of the release to eliminate the release shock.

BRIEF DESCRIPTION OF THE INVENTION

This invention is a releaseable fastener which is formed with axial slots which extend substantially through the wall of an internally threaded fastener. The fastener is surrounded by a retainer sleeve which has an annular recess and which is moveable to release the fastener into the annular recess. The slots of the fastener are filled with metal spacers, and the fastener has a non-circular external wall for the application of a fastening torque. The metal spacers permit transmission of the fastening torque from the retainer to the fastener, without complex keys and keyways.

In its preferred embodiment, the axial slots in the fastener do not extend entirely through the wall of the fastener, thereby providing a fastener with a weakened, but unsevered, wall, which has a controlled reduction in wall thickness that will provide a gradually yielding strain to fracture, thereby avoiding the mechanical shock of release.

BRIEF DESCRIPTION OF THE DRAWINGS

The invention will be described with reference to the FIGURES, of which:

FIG. 4 is an elevational, partially sectional view along lines 4—4' of FIG. 5 which illustrates another embodiment of the fastener of the invention;

FIG. 5 is an end view of the fastener shown in FIG. 4;

FIG. 6 is a view on an enlarged scale of area 6—6' of FIG. 4;

DESCRIPTION OF PREFERRED EMBODIMENTS

Figure 1:
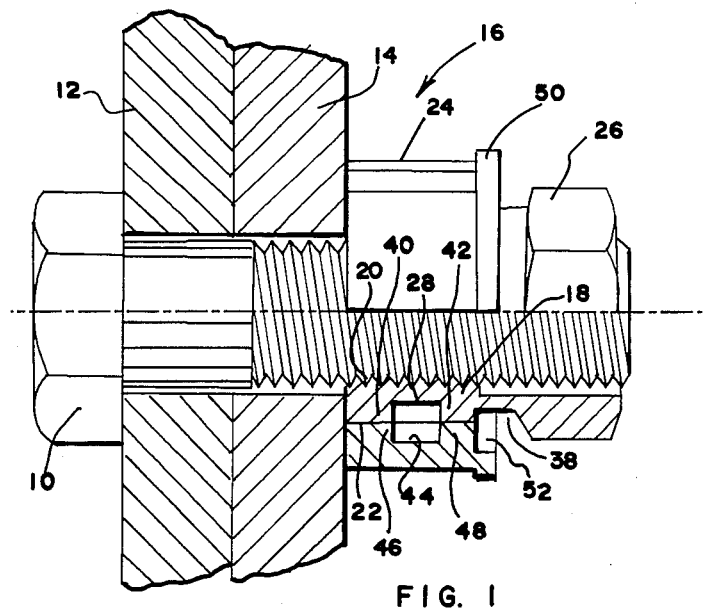
FIG. 1 is an elevational, partially sectional view along line 1—1' of FIG. 2, illustrating a fastener of the invention.
Figure 2:
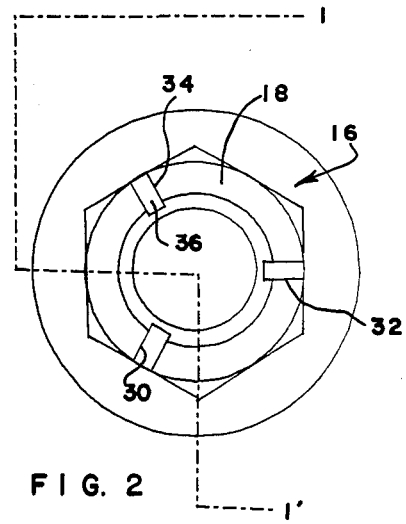
FIG. 2 is an end view of the fastener shown in FIG. 1.

The invention will be described with reference to FIG. 1, where a standard threaded bolt 10 is illustrated extending through aligned bores in plates 12 and 14. The releaseable fastener 16 comprises a slotted nut 18 which is provided with standard internal threads 20 for securing to the externally threaded bolt 10. As shown in FIG. 2, the nut has three slots 30, 32 and 34 which are spaced at equal angular increments, and which extend substantially, but not entirely, through the side wall of the nut 18. These slots extend axially, coextensive with the length of the nut, and are filled with metal spacers such as 36.

The nut 18 has a shank portion 22 which is surrounded by the retainer sleeve 24, and a driver portion 26, which is provided with wrench flats in a conventional hexagonal flatted configuration. The outer wall of the shank portion 22 is cylindrical and has annular grooves 28 and 38 intermediate its length, providing annular shoulders 40 and 42.

The retainer sleeve 24 is also cylindrical and has an annular groove 44 on its inside wall, intermediate its length which provides annular shoulders 46 and 48. The retainer sleeve is thus axially displaceable on the nut 18 and when the retainer is in the assembly position shown in FIG. 1, its shoulders 46 and 48 are opposite the shoulders 40 and 42 of the nut, thereby providing a mating engagement which secures the nut and provides hoop strength to the releaseable fastener assembly 10. The retainer sleeve 24 also has an outer annular rim 50 and a counterbore 52 at its outer end 54.

In practice, the fastener of the invention will be preassembled and the assembly 10 will be supplied to the user and applied much as a conventional nut. The fastening torque is applied to the driver portion 26 of the nut 18.

During this application, the retainer sleeve is placed in hoop stress, and provides the hoop retention of the nut 18. The fastening torque is evenly distributed about the slotted nut 18 as the metal spacers, which are placed in compressive stress, evenly transmit the torque and prevent distortion of the nut 18.

Figure 3:
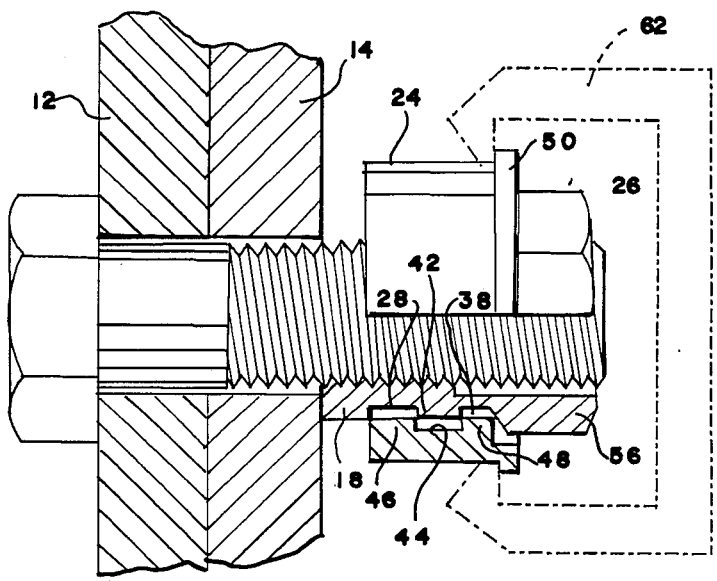
FIG. 3 is an elevational, partially sectional view of the fastener of FIG. 1 in its release position.

Referring now to FIG. 3, the releaseable fastener assembly 10 is shown in its disassembly position. As illustrated, the retainer sleeve 24 has been retracted from its assembly position, shown in FIG. 1, thereby aligning its annular groove 44 with the shoulder 42 of the nut, and its shoulders 46 and 48 with the annular grooves 28 and 38 of the nut, thereby providing a recess for the radial displacement of the segments, such as 56, of the nut. The axial tension on the fastener, which is applied to the threads of the fastener, develops a resultant radial force from the angle of the threads, and this resultant force is sufficient to overcome the tensile strength of the unslotted portion of the threads and cause the outward radial expansion of the segments.

The axial shifting of the retainer sleeve is achieved by the application of an axial force to the annular rim 50 using a conventional nut puller 62, shown in phantom lines. When the sleeve reaches the position shown in FIG. 2, it releases the hoop reinforcement of the slotted nut, and the resultant hoop stress of the unslotted thread portion of nut 18 exceeds the tensile strength of the material, and the nut fails, in a gradually increasing strain, with resultant radial deflection of the nut segments. The resultant segments can then be easily removed, often with hand torque.

Referring now to FIGS. 4 and 5, another embodiment of the invention is illustrated. In this embodiment, the nut 17 is provided with axial slots 31, 33 and 35 which extend partially through its sidewalls, forming a partially segmented nut with partial segments 57, 59 and 61. The slots 31, 33 and 35 are filled with metal spacers 37, 39 and 41. Spacer 37 is shown in elevational view in FIG. 4. The retainer sleeve 27 has an outer wall with wrench flats 21, in a conventional hexagonal configuration, and has an outer annular rim 51. The inner wall 25 of the retainer sleeve 27 is non-circular, preferably of a three-lobed concavity. The nut 17 has a mating, three-lobed external wall 19 to permit torque transmission between the retainer sleeve 27 and nut 17. The outer wall 19 of the nut and the spacers 37, 39 and 41 have an annular groove 29 to provide shoulders 47 and 49, and the inner wall 25 of the retainer sleeve 27 has a corresponding annular groove 45.

The fastener assembly 11 is placed on a bolt 10 with the retainer sleeve 27 in its assembly position, shown in FIG. 4. In this position, the retainer sleeve 27 provides hoop strength to the assembly 11 and permits its fastening onto the bolt 10.

The fastener assembly 11 can be released for easy removal by axial movement of the retainer sleeve 27 to its diassembly position with the groove 45 of the retainer sleeve 27 aligned to provide an annular recess to receive the shoulder 49 of each of the nut segments 57, 59 and 61, and spacers 37, 39 and 41, which move outwardly and separate from the bolt 10.

Referring now to FIG. 6, the partially segmented nut 19 is shown in greater detail. As previously mentioned, the slots 31, 33 and 35 do not extend entirely through the nut, but leave an unsevered thread portion 21. The slot is filled with the metal spacer 37 and surrounded by the retainer sleeve 27. In practice, the amount of unsevered thread portion can be varied to fit any particular application. Typically, the unsevered portion can be from 5 to about 95 percent, preferably from about 10 to about 50 percent, of the unsevered depth of threads. The thickness of the unsevered portion is predetermined for the release characteristics which are desired, such as the release hoop tension, rate of release, etc., thereby permitting custom fabrication of the fasteners to meet a specific customer's requirements.

Figure 7:
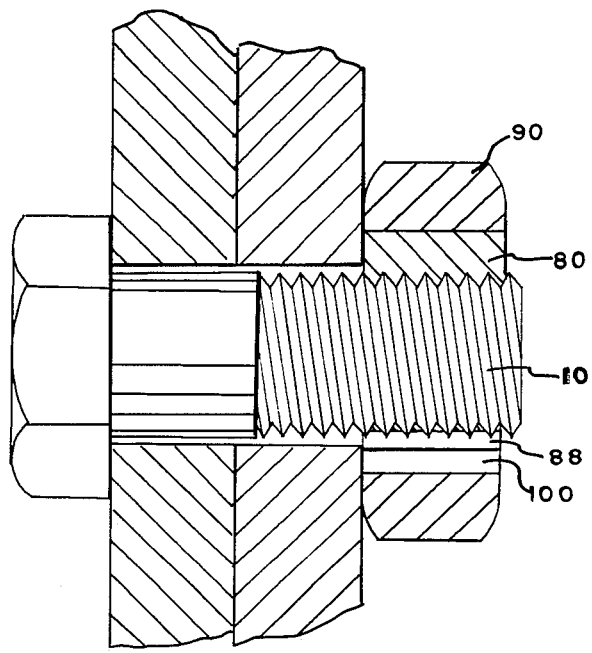
FIG. 7 is an elevational, partially sectional view along lines 7—7' of FIG. 8 which illustrates another embodiment of the fastener of the invention using a rotatable retainer sleeve.
Figure 8:
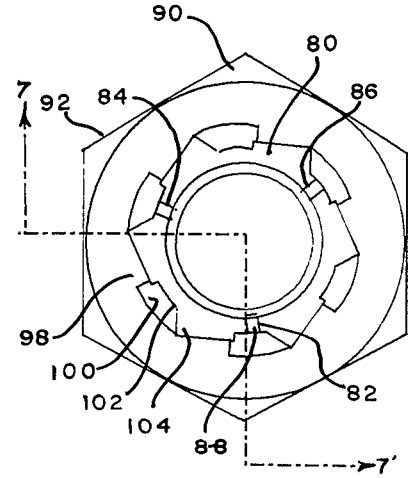
FIG. 8 is an end view of the fastener shown in FIG. 7.

Referring now to FIGS. 7 and 8, an alternative fastener system comprises a retainer sleeve which releases the hoop stress upon rotational rather than axial displacement. In this structure, a segmented nut 80 has axial slots 82, 84 and 86 (see FIG. 8) and the slots are filled with metal spacers 88. The spacer 88 in slot 82 is shown in FIG. 7, which is a view along lines 7—7' of FIG. 8 and which shows nut 80, but not bolt 10, in sectional view. As with the embodiment of FIGS. 4-6, the slots 82 do not extend entirely through the nut, but leave a small portion of unsevered threads. The nut is surrounded by retainer sleeve 90 which also has exterior wrench flats 92 in a hexagonal pattern, and a plurality of inclined cams 98 at spaced apart positions about its inner wall 99, providing axial recesses 100 therebetween. The outer wall 102 of the nut 80 has an equal number of raised cams 104. When the retainer 96 is in its assembly position, the retainer sleeve cams 98 bear against the nut cams 104 and provide hoop strength to the assembly. The incline of the cam surfaces increases radially in a clockwise direction in the view of FIG. 8, thereby providing engagement of the cams when the assembly is turned clockwise onto the bolt 10, for conventional right hand threads. A reverse inclination would be preferred for use with left hand threads, so that the cams are maintained in engagement by the fastening torque.

The reverse rotation of the retainer sleeve, counter-clockwise, as viewed in FIG. 8, permits the cams 104 to move into the annular recesses 100, thereby permitting the nut segments to move apart, releasing bolt 10. This release of the segments occurs in a gradual manner, and the hoop stress of the assembly is released in a gradual manner, as the retainer ring is rotated, and the segments are permitted to expand outwardly, along the inclined surfaces of the cams.

Figure 9:
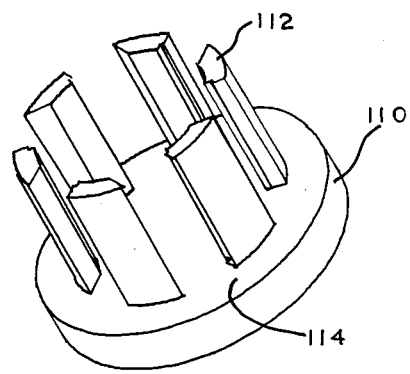
FIG. 9 is a perspective view of a spider insert useful in combination with the fastener of FIGS. 7 & 8.

Preferably the releaseable nut assembly having the rotatable cam sleeve 90 is provided with positive lock means to prevent accidental release of the retainer sleeve. A suitable lock means is shown in FIG. 9 as a spider 110 having a plurality of fingers 112, one for each of the annular recesses 100 in the releaseable nut assembly. The fingers project from a central web 114. This spider can be formed of inexpensive materials, preferably of plastics, as it does not bear any significant loading in the assembly, but is only inserted into the annular recesses 100 to prevent rotation of the retainer sleeve.

This invention is particularly useful in industrial applications for large diameter threaded fasteners, such as in use in the nuclear power industry, steam power plants, and the chemical process industry. Frequently, it requires more torque to loosen such fasteners than originally applied during their application because of corrosion, scale or deposits which have formed on the fasteners. In many plants, these fasteners must be loosened to dismantle or clean equipment on a regular maintenance schedule requiring down time for the equipment, and time spend fighting a stubborn fastener is very costly. This invention eliminates the necessity to apply high torque dismantling equipment to these fasteners. Instead, the releaseable fasteners of the invention are readily removed by movement of the retainer sleeve to release the hoop strenght of the fasteners and provide annular recesses for radial displacement of the nut segments. The retainer sleeves can be provided for rotational displacement as in the embodiment of FIGS. 7, 8 and 9, or, preferably for axial displacement as shown in the other embodiments. In either application, a relatively small force can be applied to release a significantly greater hoop tension and thereby provide ease of final removal of the fastener system.

The invention can also be applied to aerospace applications in which the partially, but not entirely, slotted nuts are used to provide a gradual release of the hoop stress of the fastener system upon retraction of the retainer sleeve. The fasteners of the invention can be employed in combination with any suitable remote actuation means, such as the explosive squibs, or hydraulic pistons and cylinders which have been used with prior segmented nut fasteners. In such applications, the gradual release of the hoop stress avoids the release shock otherwise experienced with such fasteners.

The invention has been described with reference to the illustrated and presently preferred embodiments. It is not intended that this disclosure of the presently preferred embodiments be unduly restricting. Instead, it is intended that the invention be defined by the means, and their obvious equivalents, set forth in the following claims:

What is claimed is:

1. A releasable fastener which comprises:
   (a) an internally threaded slotted fastener having at least one slot extending axially, along the length of, and substantially through, the body of said fastener and forming an axial gap therein, and a non-circular surfaced torque transmitting external wall;
   (b) a metal separator seated in each said axial slot of said slotted fastener entirely filling the gap thereof and forming an assembly with said fastener;
   (c) a retainer ring surrounding the assembly of said slotted fastener and metal separator, and having a torque transmitting section comprising an internal wall with a mating contour to the external wall of said fastener and being in hoop stress relationship to said assembly with said separator evenly transmitting the stress and preventing distortion of said fastener, and an annular recess disposed in the internal wall of said fastener and axially y adjacent to said torque transmitting section.

2. The fastener of claim 1 including a plurality of said slots and a like plurality of said metal separators.

3. The fastener of claim 1 wherein said axial slot extends at least 65 percent of the width of said fastener, but not entirely therethrough to provide a hoop stress yielding fastener.

4. The fastener of claim 3 including a plurality of said slots and a like plurality of said metal separators.

5. The fastener of claim 1 wherein said non-circular surfaced external wall has at least one flatted surface which mates with an internally flatted surface of said retainer ring.

6. The fastener of claim 1 wherein said retainer sleeve has an internal wall conforming to and mating with the non-circular surfaced external wall of said fastener to permit transmission of torque therebetween.

7. The fastener of claim 1 wherein said non-circular surfaced external wall has at least one surface lobe which mates with a corresponding lobed cavity in the internal wall of said retainer ring.

8. The fastener of claim 7 including three surface lobes which mate with corresponding lobed cavities in the internal wall of said retainer ring.

9. A releasable fastener which comprises:
   (a) an internally threaded slotted fastener having at least one axial slot extending substantially through the body of said fastener and having a non-circular surfaced, torque transmitting external wall bearing a plurality of radial cams disposed in equal angular increments;
   (b) a metal separator seated in each said axial slot of said slotted fastener to fill the gap thereof;
   (c) a retainer ring surrounding said slotted fastener and having a torque transmitting section comprising an internal wall bearing a like numeral of inclined cams with axial recesses interspaced therebetween, with said inclined cams in hoop stress bearing relationship to said radial cams on the external wall of said fastener, whereby said hoop stress bearing relationship between said retainer sleeve and said fastener can be relieved by rotation of said retainer sleeve to move said axial recesses opposite said radial cams.

10. The fastener of claim 9 including a plurality of said axial slots and a like plurality of said metal separators.

11. The fastener of claim 9 wherein said axial slot extends at least 65 percent of the width of said fastener, but not entirely therethrough to provide a hoop stress yielding fastener.

12. The fastener of claim 11 including a plurality of said slots and a like plurality of said metal separators.

13. The fastener of claim 12 wherein said slots extend through all but the internal threads of said fastener.

14. The fastener of claim 12 wherein said slots extend entirely through said fastener to provide a plurality of fastener segments which are interspaced with said metal separators.

15. The fastener of claim 9 including lock means comprising at least one pin having a cross section conforming to, and received in at least one of said axial recesses.

16. The fastener of claim 13 wherein said lock means comprises a spider having a base plate supporting a plurality of said pins disposed in equal angular spacings thereon for alignment with said plurality of axial recesses.

17. A releasable fastener which comprises:
   (a) an internally threaded slotted fastener having at least one axial slot extending through all but the internal threads of said fastener, and forming at least one axial gap therein, and having a non-circular surfaced, torque transmitting external wall; and
   (b) a retainer ring surrounding said slotted fastener and having a torque transmitting section comprising an internal wall with a mating contour in hoop stress bearing relationship to the external wall of said fastener, and an annular recess disposed in its internal wall and axially adjacent to said torque transmitting section, said annular recess being axially moveable relative to said slotted fastener between a retaining position in hoop stress bearing relationship to said slotted fastener and a hoop-stress-releasing position.

18. The releasable fastener of claim 17 including a metal separator seated in each said axial slot of said slotted fastener to fill the gap thereof.

19. A releasable fastener which comprises:

(a) an internally threaded slotted fastener having a plurality of axial slots extending entirely through the body of said fastener to provide a plurality of fastener segments, each separated from its adjacent segment by an axial gap, and each having a non-circular surfaced, torque transmitting external wall;

(b) a like plurality of metal separators, one each seated in each said axial slot of said slotted fastener to fill the gap thereof and form an assembly of fastener segments interspaced by said metal separators; and (c) a retainer ring surrounding said slotted fastener segments and interspaced metal separators, and having a torque transmitting section comprising an internal wall with a mating contour to the external walls of said fastener segments and being in hoop stress relationship to said assembly with said separators evenly transmitting the stress and preventing distortion of said fastener segments, and an annular recess disposed in said internal wall of said retainer ring and axially adjacent to said torque transmitting section.

* * * * *